(12) United States Patent
Niwa et al.

(10) Patent No.: US 8,301,365 B2
(45) Date of Patent: Oct. 30, 2012

(54) NAVIGATION DEVICE PRESENTING INFORMATION REGARDING CHARGING AND VEHICLE INCLUDING SAME DEVICE

(75) Inventors: Toshiaki Niwa, Okazaki (JP); Masatoshi Takahara, Okazaki (JP)

(73) Assignees: Toyota Jidosha Kabushiki Kaisha, Toyota (JP); Aisin AW Co., Ltd, Anjo (JP)

( * ) Notice: Subject to any disclaimer, the term of this patent is extended or adjusted under 35 U.S.C. 154(b) by 282 days.

(21) Appl. No.: 12/451,800

(22) PCT Filed: Jun. 26, 2008

(86) PCT No.: PCT/JP2008/062038
§ 371 (c)(1),
(2), (4) Date: Dec. 1, 2009

(87) PCT Pub. No.: WO2009/013980
PCT Pub. Date: Jan. 29, 2009

(65) Prior Publication Data
US 2010/0169008 A1  Jul. 1, 2010

(30) Foreign Application Priority Data
Jul. 24, 2007 (JP) .................................. 2007-192185

(51) Int. Cl.
*G01C 21/30* (2006.01)
(52) U.S. Cl. ....................................................... 701/208
(58) Field of Classification Search .......................... None
See application file for complete search history.

(56) References Cited

U.S. PATENT DOCUMENTS
5,815,824 A    9/1998  Saga et al.
2002/0156545 A1*  10/2002  Sekino et al. ................... 700/90
(Continued)

FOREIGN PATENT DOCUMENTS
JP    A-9-210702    8/1997
(Continued)

OTHER PUBLICATIONS
International Search Report issued in International Application No. PCT/JP2008/062038; Mailed Sep. 16, 2008.
(Continued)

*Primary Examiner* — Thomas Tarcza
*Assistant Examiner* — Nagi Murshed
(74) *Attorney, Agent, or Firm* — Oliff & Berridge, PLC

(57) ABSTRACT

An ECU executes a program including a step of detecting a present location using a GPS system; a step of reading out data of a geographical map proximate to the present location and presenting in the geographical map charging installations including a charging installation employing solar light, together with the location of its vehicle; a step of, if a presentation switching request is made and a real-time solar radiation correction request is made, detecting a solar radiation amount and correcting a charge amount per unit time provided by the power generation installation employing solar light, based on the detected solar radiation amount; and a step of detecting an SOC in the battery to calculate an amount of discharge done until arrival at the charging installation, calculating time required for charging up to a fully charged state, and presenting the time required for charging in the geographical map.

21 Claims, 10 Drawing Sheets

U.S. PATENT DOCUMENTS

| | | | |
|---|---|---|---|
| 2004/0169489 A1* | 9/2004 | Hobbs | 320/104 |
| 2005/0027442 A1* | 2/2005 | Kelley et al. | 701/202 |
| 2006/0186890 A1* | 8/2006 | Iwane et al. | 324/426 |
| 2007/0052552 A1* | 3/2007 | Suzuki | 340/905 |
| 2008/0211230 A1* | 9/2008 | Gurin | 290/2 |

FOREIGN PATENT DOCUMENTS

| | | |
|---|---|---|
| JP | A-2000-253504 | 9/2000 |
| JP | A-2000-258174 | 9/2000 |
| JP | A-2000-353295 | 12/2000 |
| JP | A-2001-215124 | 8/2001 |
| JP | A-2003-262525 | 9/2003 |
| JP | A-2005-163584 | 6/2005 |
| JP | A-2006-327247 | 12/2006 |
| JP | A-2007-116799 | 5/2007 |

OTHER PUBLICATIONS

Chinese Office Action issued in Chinese Patent Application No. 200880025581.7 dated Jul. 26, 2011 (with partial translation).

* cited by examiner

F I G. 1
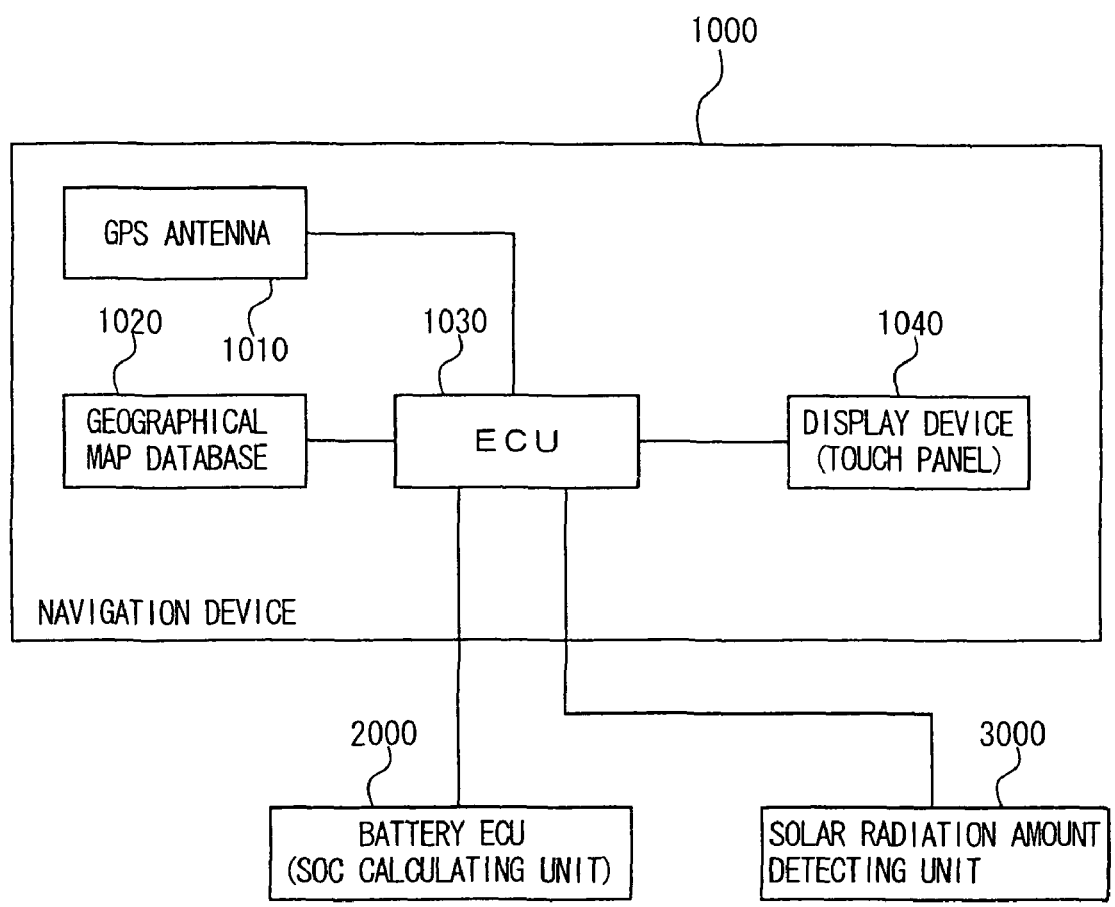

FIG. 2

| MANAGEMENT ID | LOCATION INFORMATION | | INSTALLATION TYPE | CHARGE AMOUNT |
|---|---|---|---|---|
| | LATITUDE | LONGITUDE | | |
| 0001 | ... | ... | CHARGING INSTALLATION EMPLOYING ELECTRIC POWER | NORMAL: (A) kWh/min |
| | | | | FAST: (B) kWh/min |
| 0002 | ... | ... | CHARGING INSTALLATION EMPLOYING SOLAR CELL | (C) kWh/min |
| 0003 | ... | ... | UTILIZE BOTH | ... |
| 0004 | ... | ... | ELECTRIC POWER | ... |
| ... | ... | ... | ... | ... |

F I G. 7

| MANAGEMENT ID | LOCATION INFORMATION | | INSTALLATION TYPE | CHARGE AMOUNT |
|---|---|---|---|---|
| | LATITUDE | LONGITUDE | | |
| 0 0 0 1 | ... | ... | CHARGING INSTALLATION EMPLOYING ELECTRIC POWER | NORMAL: (A) kWh/min |
| | | | | FAST: (B) kWh/min |
| 0 0 0 2 | ... | ... | CHARGING INSTALLATION EMPLOYING SOLAR CELL | (C) kWh/min |
| 1 0 0 3 | ... | ... | PARKING LOT | (D) kWh/min WITH 100% SOLAR RADIATION |
| 1 0 0 4 | ... | ... | PARKING LOT | (E) kWh/min WITH 80% SOLAR RADIATION |
| ... | ... | ... | ... | ... |

NAVIGATION DEVICE PRESENTING INFORMATION REGARDING CHARGING AND VEHICLE INCLUDING SAME DEVICE

TECHNICAL FIELD

The present invention relates to a vehicle having a power storage mechanism (battery, capacitor, or the like) mounted thereon and traveling using electric power supplied therefrom, in particular, to a technique for presenting information allowing for efficient charging at a location other than a registered vehicle-depository.

BACKGROUND ART

As environmentally friendly vehicles, hybrid vehicles are known. In addition to a conventional internal combustion engine, a hybrid vehicle includes a power storage mechanism, an inverter, and a motor driven by the inverter, as a motive power source for traveling of the vehicle.

In recent years, among such hybrid vehicles, a plug-in hybrid vehicle has been drawing attention in pursuit of achieving a longer traveling distance using only a motor. The plug-in hybrid vehicle has a power storage mechanism that can be charged from a power source (household power source or the like) external to the vehicle. Meanwhile, an electric vehicle, which includes no internal combustion engine, travels in a way similar to that of the hybrid vehicle when it uses only the motor during traveling. If electric power generated by a solar cell is used as an external power source for such plug-in hybrid vehicle and electric vehicle, further environmental friendly practice can be achieved.

Generally, charging for the plug-in hybrid vehicle takes longer time than replenishing of fuel for the conventional internal combustion engine. Hence, the power storage mechanism is charged, for example, at nighttime at which the vehicle is not used, using electric power supplied to home, in a registered vehicle-depository (for most individual users, parking areas at home). When the vehicle thus charged travels at daytime using the motor driven by the electric power from the power storage mechanism, it consumes the electric power stored in the power storage mechanism. In such a case, charging may be required using an external power source. As described above, the charging requires long time, so it is preferred to charge it when the user does not need to run the vehicle. Further, if electric power generated by the solar cell is used as the external power source, time required for the charging varies depending on a solar radiation amount (weather conditions).

Japanese Patent Laying-Open No. 2000-258174 discloses a technique for displaying weather information on a navigation device. Japanese Patent Laying-Open No. 2000-353295 discloses a technique regarding a navigation device, provided in a vehicle having a solar cell mounted thereon, for guiding a route irradiated with a large amount of solar light.

When charging a power storage mechanism of a vehicle having no solar cell by means of electric power generated by a solar cell or when charging a power storage mechanism of a vehicle having a solar cell by means of electric power generated by the solar cell mounted on the vehicle, time required for charging (vehicle stop time) differs depending on weather conditions. Further, it takes a longer time to charge it using electric power not generated by the solar cells or electric power not generated by the solar cells or electric power not generated by the solar cells or electric power not generated by the solar cells (electric power supplied from an electric power company having a power plant and electrical transmission equipment), than time required for the conventional fuel replenishing.

During a period of such charging, the vehicle has to be stopped (it is not considered that the power storage mechanism is charged during traveling by the solar cell mounted on the vehicle). Namely, during the period of charging, the user cannot run the vehicle. Conversely, it can be said that while the user is doing his/her desired activity (shopping, meal, recreation, or the like) at a destination reached, the vehicle does not need to be run.

In view of the above-described patent documents, a relation between time required for the activity at the destination and time required for charging is unknown. In addition, if there are a variety of charging facilities, it is difficult for the user to select an appropriate charging facility. Particularly, where solar light is used for charging, time required for the charging varies depending on weather conditions. This makes it more difficult for the user to select and determine a charging facility.

The present invention is made in light of the foregoing problem and its object is to provide a navigation device for presenting information regarding charging of a power storage mechanism to allow a user who uses a vehicle at daytime to select a charging facility with ease, and a vehicle including the device.

DISCLOSURE OF THE INVENTION

A navigation device according to a first feature includes: a display unit for displaying a detected location of a vehicle and stored geographical map information; a storage unit for storing location information of a charging facility having a solar cell to charge a power storage mechanism mounted on the vehicle using electric power generated through solar light energy; and a control unit for controlling the display unit to present information about the charging facility on the display unit.

The first feature is now described. When an electric vehicle or a plug-in hybrid vehicle travels by means of a motor driven using electric power of a power storage mechanism (a battery or a capacitor), electric power stored in the power storage mechanism is consumed. When the navigation device is provided in such a vehicle and charging is required during traveling, the display unit thereof displays location information of a charging facility (hereinafter, also referred to as "charging installation" or "charging station" but the meanings thereof are the same) for charging the power storage mechanism using electric power generated through solar light energy, and information about the charging facility. An example of the information about the charging facility is a charging performance attained based on an amount of electric power generated by a solar cell or charging time ("charging time" refers to a time period taken to charge the power storage mechanism of the vehicle up to a predetermined charge amount). This allows a user to readily recognize the level of a charging performance attained by a charging facility or time required for charging. Particularly, when a charging facility that charges the power storage mechanism using electric power generated through solar light energy exists in the vicinity of a destination (vicinity including parking areas of a restaurant, a shopping center, and a leisure facility), the user can readily recognize how much the power storage mechanism can be charged, from charging time taken in the charging facility and time spent in the destination. This can provide a navigation device which presents information regarding charging for a power storage mechanism and allows a user who uses a vehicle at daytime to select and determine a charging facility.

In addition to the configuration of the first feature, the navigation device according to the second feature is configured such that the control unit causes the display unit to present thereon, in association with a location of the charging facility, information about a charging performance in the charging facility attained based on an amount of electric power generated by the solar cell.

The second feature is now described. Normally, each charging facility provides a different charging performance, for example, as more solar cell panels are used for one vehicle to be charged and the solar cells have higher energy conversion efficiency, the charging performance in the charging facility is higher. Hence, a charging facility providing a high charging performance can be readily recognized, thus allowing the user to efficiently charge it.

In addition to the configuration of the second feature, the navigation device according to the third feature is configured such that the information about the charging performance is at least one of information about an amount of charging electric power per unit time, information about a ratio of increase of a charge amount per unit time to a fully charged state, and information about a distance in which the vehicle is capable of traveling using the amount of charging electric power per unit time.

According to the third feature, the display unit presents, with regard to each charging facility, at least one of the information about the amount of charging electric power per unit time, the information about the ratio of increase of the charge amount per unit time to the fully charged state (in the case of a battery, a ratio of increase of an SOC (States Of Charge)), and information about a distance in which the vehicle is capable of traveling using the amount of charging electric power per unit time. This allows the user to readily recognize a charging facility suitable for his/her vehicle.

In addition to the configuration of the third feature, the navigation device according to a fourth feature is configured such that the control unit causes the information about the charging performance to be presented in consideration of the amount of electric power generated by the solar cell, which varies depending on a weather condition.

The fourth feature is now described. The amount of electric power generated by the solar cell (energy conversion efficiency) differs depending on the weather condition (solar radiation amount). In order to present the information about the charging performance, the amount of electric power generated by the solar cell and varying depending on the weather condition can be taken into consideration by acquiring information of the weather condition via a communication device or a solar radiation amount detection sensor provided in the vehicle. This allows the user to readily recognize a charging facility suitable for his/her vehicle in consideration of the variation of electric power generated by the solar cell and varying during daytime depending on seasons and weather, and in view of its charging performance.

In addition to the configuration of the first feature, the navigation device according to a fifth feature is configured such that the control unit causes the display unit to present thereon, in association with a location of the charging facility, information about charging time that is based on an amount of electric power generated by the solar cell.

According to the fifth feature, the information about the charging time that is based on the amount of electric power generated by the solar cell is presented on the display unit in association with the location of the charging facility. This allows easy recognition of charging time in a charging facility that charges the power storage mechanism using electric power generated through solar light energy and that is located in the vicinity of the destination (vicinity including parking areas of a restaurant, a shopping center, and a leisure facility). With this, a charging facility can be selected in consideration of time spent in the destination.

In addition to the fifth feature, the navigation device according to a sixth feature is configured such that the control unit causes the information about the charging time to be presented in consideration of the amount of electric power generated by the solar cell, which varies depending on a weather condition.

The sixth feature is now described. The amount of electric power generated by the solar cell (energy conversion efficiency) differs depending on the weather condition (solar radiation amount). In order to display the information about the charging time, the amount of electric power generated by the solar cell and varying depending on the weather condition can be taken into consideration by acquiring information of the weather condition via a communication device or a solar radiation amount detection sensor provided in the vehicle. This allows the user to readily recognize a charging facility suitable for his/her vehicle in consideration of the variation of electric power generated by the solar cell and varying during daytime depending on seasons and weather, and in view of its charging time.

In addition to the configuration of any one of the first to sixth features, the navigation device according to a seventh feature is configured such that the control unit causes information about charging time in the charging facility to be presented in consideration of a discharge amount resulting from traveling of the vehicle to the charging facility.

The seventh feature is now described. When traveling by means of the motor driven using the electric power generated by the power storage mechanism (a battery or a capacitor) of the vehicle operated by the user, electric power stored in the power storage mechanism is consumed until arrival at the location of the charging facility presented by the navigation device. In consideration of this, the information about the charging time in the charging facility is presented, thus allowing easy recognition of actually required charging time.

In addition to the configuration of the seventh feature, the navigation device according to an eighth feature is configured such that the control unit causes the information about the charging time in the charging facility to be presented in consideration of a traffic condition during traveling of the vehicle to the charging facility.

The eighth feature is now described. When there is a traffic jam on a way to the location of the charging facility presented by the navigation device, a state of discharging from the power storage mechanism differs from that when there is no traffic jam. In view of this, the information about the charging time in the charging facility is presented, thus allowing easy recognition of actually required charging time.

In addition to the configuration of any one of the first to sixth features, the navigation device according to a ninth feature is configured such that the control unit causes the information about the charging facility to be presented in consideration of an amount of electric power generated by a solar cell mounted on the vehicle.

According to the ninth feature, the vehicle has the solar cell mounted thereon, and electric power generated by the solar cell mounted on the vehicle can be used to charge the power storage mechanism during charging in a charging facility. Hence, in consideration of the charging performance provided by the solar cell mounted on the vehicle, for example, information about the charging time can be presented. On this occasion, differences in performance among charging facilities can be taken into consideration, and weather conditions can be considered in the information about the charging performance, as described above.

In addition to any one of the first to sixth features, the navigation device according to a tenth feature is configured such that the control unit causes information about charging time in the charging facility to be presented in consideration of at least one of an amount of electric power generated by the solar cell mounted on the vehicle during traveling of the vehicle to the charging facility and a discharge amount resulting from the traveling.

The tenth feature is now described. When traveling by means of a motor driven using electric power stored in the power storage mechanism (a battery or a capacitor) until the vehicle operated by the user arrives at the location of the charging facility presented by the navigation device, electric power stored in the power storage mechanism is consumed and the power storage mechanism is charged by the solar cell mounted on the vehicle (the electric power generated may be directly supplied to the motor). In consideration of this, the information about the charging time in the charging facility is presented, thus allowing easy recognition of actually required charging time.

In addition to the configuration of the tenth feature, the navigation device according to an eleventh feature is configured such that the control unit causes the information about the charging time in the charging facility to be presented in consideration of a traffic condition during traveling of the vehicle to the charging facility.

According to the eleventh feature, when there is a traffic jam on a way to the location of the charging facility presented by the navigation device, the charge/discharge state of the power storage mechanism is different from that when there is no traffic jam. In view of this, the information about the charging time in the charging facility is presented, thus allowing easy recognition of actually required charging time.

A vehicle according to a twelfth feature is a vehicle having a navigation device according to any one of the first to eleventh features.

According to the twelfth feature, the vehicle's user can see the information about the charging facility presented on the display unit of the navigation device, which allows him/her to select a charging facility readily.

BRIEF DESCRIPTION OF THE DRAWINGS

FIG. 1 is a control block diagram of a vehicle including a navigation device according to a first embodiment of the present invention.

FIG. 2 shows one example of information of charging stations stored in a geographical map database of FIG. 1.

FIG. 7 shows one example of information of charging stations stored in a geographical map database of FIG. 6.

BEST MODES FOR CARRYING OUT THE INVENTION

Figure 3:
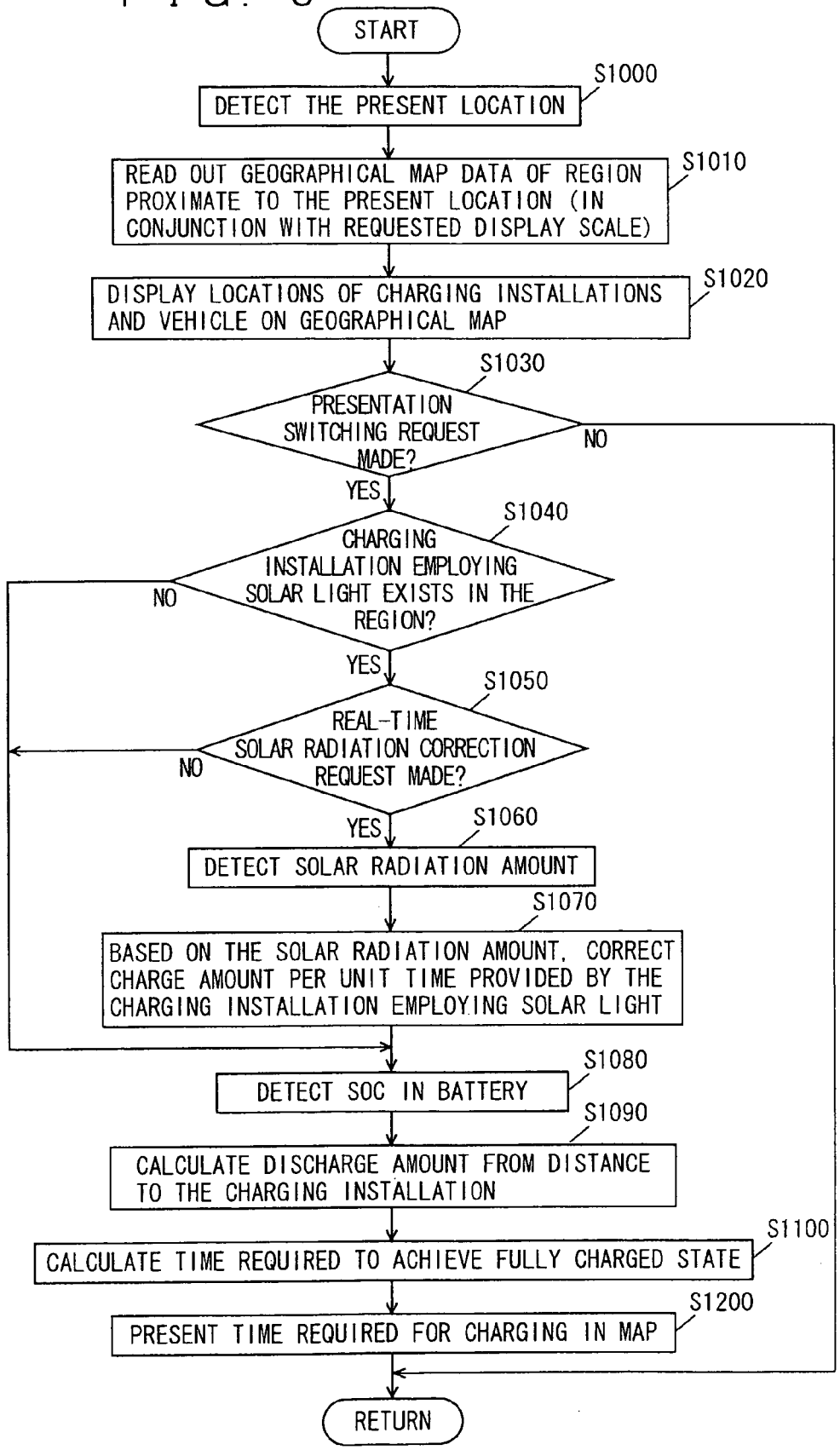
FIG. 3 is a flowchart showing a control structure of a program executed by an ECU of FIG. 1.

Embodiments of the present invention will be described in detail below with reference to figures. It should be noted that the same or equivalent portions will be given the same reference characters and explanation therefor will not be repeated.

First Embodiment

In a first embodiment, a case where the present invention is applied to a vehicle having no solar cell mounted thereon will be described. This vehicle may be a hybrid vehicle, an electric vehicle, or a fuel-cell vehicle as long as it is a vehicle having a power storage mechanism (battery or capacitor) for supplying electric power to a motor serving as a motive power source for traveling and has a function allowing the power storage mechanism to be charged using an external power source. In the description below, it is assumed that the power storage mechanism is a battery (secondary battery).

FIG. 1 shows a control block diagram of a vehicle including a navigation device according to the present embodiment. As shown in FIG. 1, the vehicle includes a navigation device 1000, a battery ECU 2000, and a solar radiation amount detecting unit 3000.

Navigation device 1000 includes a GPS (Global Positioning System) antenna 1010, a geographical map database 1020 (any recording medium having geographical map information electronically recorded thereon), an ECU (Electronic Control Unit) 1030 for executing a program described below, and a display device 1040 having a touch panel function.

In the present embodiment, ECU 1030 of navigation device 1000 executes a program that causes display device 1040 of navigation device 1000 to display thereon information about charging facilities, in order to allow a user of the vehicle to determine a selection from the charging facilities with ease. However, such information about charging facilities may be displayed by means of a program executed by another ECU.

GPS antenna 1010 is a known GPS antenna, and receives signals from at least three GPS satellites orbiting around the earth. ECU 1030 identifies the location of the vehicle based on the signals received by GPS antenna 1010.

Geographical map database 1020 stores the geographical map information used for known navigation devices as well as information about charging stations as shown in FIG. 2.

As shown in FIG. 2, geographical map database 1020 stores, as the information about the charging stations, management IDs (identifications) of the charging stations, location information (latitude data and longitude data) of the charging stations, installation type information of the charging stations, and information about a charge amount (charging performance) per unit time provided by each charging station.

For example, as shown in FIG. 2, geographical map database 1020 stores information that a charging station having a management ID "0001" is a charging installation that employs electric power (the electric power herein refers to electric power supplied by an electric power company having a power plant and electric power transmission equipment) and has a charging performance of (A) kWh/min (as one example of unit time, "minute" is employed herein) for normal charging and has a charging performance of (B) kWh/min for fast charging.

Further, geographical map database 1020 stores information that a charging station having a management ID "0002" is a charging installation including a solar cell, and has a charging performance of (C) kWh/min. Like a charging station having a management ID "0003", there may be used a combination type charging installation that employs both electric power (the electric power herein refers to electric power supplied by an electric power company having a power plant and electric power transmission equipment) and electric power generated by a solar cell. It is preferable if information about charging fees is stored in addition to the charging performances, because the user selects a charging station for a lower price readily. In this case, if information can be presented on display device 1040 to indicate that a charging fee in a charging station employing electric power generated by a solar cell is less expensive, the user may select the charging station employing the electric power generated by the solar cell, resulting in more environmentally friendly practice.

In the description herein, it is assumed that the vehicle's battery can accept electric power greater than the electric power attained by the charging performances (charge amount per unit time) of the charging stations. Namely, the battery serving as a power storage mechanism of the vehicle has a performance of accepting charge equal to or greater than the maximal charge amount per unit time. Where there is a charging station that does not satisfy this condition, such a charging station is excluded from charging stations displayed on display device 1040, with the charging performance for the vehicle being stored separately.

ECU 1030 identifies the location of the vehicle based on signals received from three or more GPS satellites via GPS antenna 1010, and presents the location of the vehicle in a geographical map displayed on display device 1040 based on the geographical map information stored in geographical map database 1020. In addition to such presentation, ECU 1030 presents information of charging installations in the geographical map displayed on display device 1040 as described later.

Display device 1040 is configured to receive an input as to a user's desired scale of the geographical map via its touch panel. Further, if a charging station serving as a charging installation employs electric power generated by a solar cell, the generated electric power varies depending on a solar radiation amount (charging performance thereof also varies accordingly). Hence, display device 1040 is configured to be capable of receiving an input as to whether to make a request for correction based on the variation of the solar radiation amount in real time (real-time solar radiation correction request). Furthermore, display device 1040 is configured to be capable of receiving an input as to whether or not the user simply makes a request (presentation switching request) to switch from a screen presenting charging performances of charging stations each serving as a charging installation to a screen presenting charging time required to charge the battery of the vehicle fully or up to 80% from the remaining amount.

Battery ECU 2000 uses, for example, an SOC as a management indicator to control charging/discharging of the battery mounted on the vehicle and used for traveling. The SOC is calculated by battery ECU 2000 when it integrates values of open voltage of the battery or values of charging current to the battery.

Solar radiation amount detecting unit 3000 is attached to, for example, a windshield to detect a degree of solar radiation.

Note that solar radiation amount detecting unit 3000 may be adapted to communicate with a server device distributing weather information, in order to acquire information regarding a solar radiation amount during traveling of the vehicle or information regarding a solar radiation amount in a location where the vehicle is expected to travel.

Controlling the presentation for a charging station in such a navigation device according to the present embodiment can be implemented by hardware mainly utilizing digital circuit or analog circuit configurations, or software mainly utilizing a CPU (Central Processing Unit) and a memory included in ECU 1030 and a program read out from the memory and executed by the CPU. Generally, it is said that when implemented by hardware, it is advantageous in terms of operation speed, and when implemented by software, it is beneficial in terms of design change. In the description below, a case where the control over the presentation for the charging stations in the navigation device is implemented by software will be explained. Note that a recording medium having such a program recorded thereon is also an embodiment of the present invention.

Referring to FIG. 3, the following describes a control structure of the program executed by ECU 1030 to control the presentation of the charging stations in the navigation device according to the present embodiment. Note that this program is a subroutine, and is repeatedly executed at a predetermined cycle time. Note also that in this program, only processes for controlling the presentation of the charging stations in navigation device 1000 are described.

In a step (hereinafter, "step" is abbreviated as S) 1000, ECU 1030 detects the present location of the vehicle based on data received from the GPS satellites via GPS antenna 1010. In an S1010, ECU 1030 reads out from geographical map database 1020 geographical map data indicating a region proximate to the present location. On this occasion, the geographical map data indicating the region proximate to the present location is determined and read out from geographical map database 1020 in conjunction with a scale on which the geographical map data is requested to be displayed. In S1010, ECU 1030 presents the locations of the charging installations (charging stations) and the location of the vehicle on display device 1040 over the geographical map information thus read out. In this way, on display device 1040, together with the geographical map information, the location of the vehicle, the locations of the charging installations, and their charging performances are displayed.

In an S1030, ECU 1030 determines whether or not the user has requested presentation switching. Specifically, it is determined from whether or not a "presentation switching" button set at the touch panel of display device 1040 has been pressed. Note that it is assumed that this presentation switching corresponds to a switching request from presentation of "charging performances per unit time" to presentation of "charging time required to fully charge or charge up to an SOC of 80%". If the presentation switching request is detected (YES in S1030), the process goes to S1040. If not (NO in S1030), this process (subroutine) is terminated. Note that the presentation switching may correspond to a switching request from presentation of "charging performance per unit time that is based on a standard performance of a solar cell" to presentation of "charging performance per unit time that is based on a solar cell's performance that is in consideration of a solar radiation amount at the present moment".

In an S1040, ECU 1030 determines whether or not there is a charging installation employing solar light in the displayed region. On this occasion, whether or not there is a charging installation employing solar light is determined from geographical map database 1020 shown in FIG. 2 based on the location information and installation types of the charging installations. If it is determined that there is a charging installation employing solar light in the displayed region (YES in S1040), the process goes to S1050. If not (NO in S1040), the process goes to S1080.

In an S1050, ECU 1030 determines whether or not a request (real-time solar radiation correction request) has been made to correct variation of an amount of electric power generated by the solar cell and present a charging performance in real time. It is assumed that whether to make a real-time solar radiation correction request can be set through an initial setting screen of navigation device 1000.

In an S1060, ECU 1030 detects a solar radiation amount at the present moment in the vicinity of the vehicle based on a solar radiation amount detection signal received from solar radiation amount detecting unit 3000. If information for a charging station located away from the location of the vehicle (distant away to such an extent that the solar radiation amount differs between their locations) and employing a solar cell is to be presented on display device 1040, the solar radiation amount in the vicinity of the charging station is detected based on information received from the server device distributing weather information.

In an S1070, based on the detected solar radiation amount, ECU 1030 corrects the charge amount per unit time provided by the charging installation employing solar light. The charge amount is corrected as follows, for example. That is, in geographical map database 1020 shown in FIG. 2, a charge amount per unit time (charging performance) provided by the charging station employing the solar cell is correlated with a specific solar radiation amount and is stored as a performance of 100%, and a ratio of decrease in generated electric power is calculated from the detected solar radiation amount.

In an S1080, ECU 1030 detects an SOC in the battery of the vehicle at the present moment, based on information received from battery ECU 2000. In an S1090, ECU 1030 calculates a discharge amount of the battery based on a distance from the present location of the vehicle to each of the charging installations. On this occasion, ECU 1030 estimates an amount (discharge amount) of electric power discharged from the battery until the vehicle reaches each charging installation, based on the distance from the present location of the vehicle to each charging installation (if slope or traffic conditions are considered, it is more desirable in terms of precise determination of an actual discharge amount), using a separately stored traveling database (for example, a database in which a relation between a traveling pattern and an amount of charging/discharging electric power or an SOC is mapped).

In an S1100, ECU 1030 estimates an SOC in the battery left upon arrival of the vehicle at each charging installation, based on the detected present SOC of the vehicle and an estimated amount (discharge amount) of electric power discharged from the battery until the vehicle reaches each charging installation. From the SOC thus estimated, ECU 1030 calculates time required to charge up to a fully charged state (the fully charged state herein may refer to an SOC of 100% or an SOC of 80%, which is set as a so-called "control upper limit value" in a hybrid vehicle). It is assumed that correlating such a fully charged state to an SOC of a certain level can be set through the initial setting screen of navigation device 1000. On this occasion, ECU 1030 calculates a required amount of electric power for charging, from shortage in an SOC (SOC to be achieved by charging). Using the required amount of electric power for charging and the charge amount per unit time (which may have been subjected to real time solar radiation amount correction in the case of a charging station employing a solar cell), ECU 1030 computes to determine time required to achieve the fully charge state.

In an S1200, ECU 1030 presents the times required for charging in the geographical map, in association with displayed icons that represent the charging stations respectively.

The following describes an operation performed by the navigation device according to the present embodiment based on the above-described structure and process of the flowchart under control of ECU 1030.

During traveling of the vehicle having the navigation device 1000, the location of the vehicle is detected based on data received from the GPS satellites (S1000), geographical map data is read out from geographical map database 1020 in conjunction with a scale (S1010), and the locations of the charging installations (charging stations) and the location of the vehicle are presented in the geographical map on display device 1040 (S1020).

Figure 4:
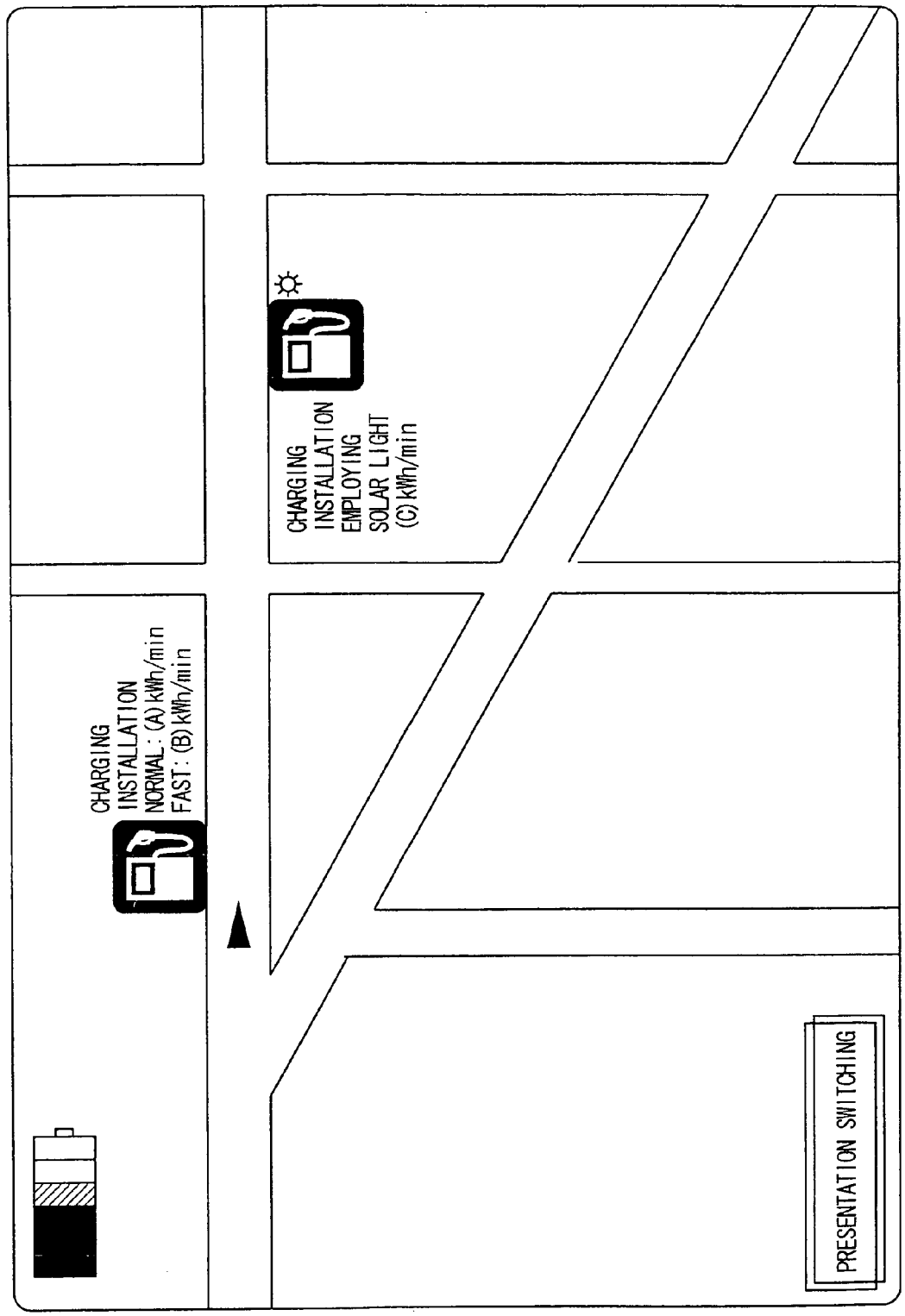
FIG. 4 is a (first) diagram showing one example of a screen displayed on a display device when a process shown in the flowchart of FIG. 3 is executed.

FIG. 4 shows one example of the geographical map displayed on display device 1040 on this occasion. In FIG. 4, the charging installations having the management IDs "0001" and "0002" in the geographical map database of FIG. 2 are displayed as icons. Also, their charging performances, which have not been subjected to real time solar radiation amount correction, are presented. On the lower left side of the screen of display device 1040, the presentation switching button (for use in the touch panel) is displayed. On the upper left side of the screen of display device 1040, an image is displayed to represent an amount of charge in the battery.

If the user touches the presentation switching button of FIG. 4 (YES in S1030) and a charging installation employing a solar cell exists in the geographical map currently displayed on display device 1040 (YES in S1040), whether to make a real-time solar radiation correction request is determined. Regarding the real-time solar radiation correction request, it is assumed that in a screen different from the screen shown in FIG. 4, the user has made settings as an initial value such that the real-time solar radiation correction request is to be made.

Since it is set that the real-time solar radiation correction request is to be made in the case of a charging installation employing a solar cell (YES in S1050), a solar radiation amount is detected (S1060). A charge amount per unit time is corrected based on an amount of electric power generated based on the detected solar radiation amount, relative to an amount of generated electric power corresponding to a standard (or maximal) solar radiation amount (S1070).

An SOC in the battery at the present moment (assuming that the vehicle has not reached the charging installation yet) is detected (S1080), and a discharge amount of the battery until the vehicle reaches the charging installation is calculated from a distance to the charging installation in consideration of road slope conditions and traffic conditions (S1090). The SOC in the battery upon arrival of the vehicle at the charging installation is estimated, and from the SOC thus estimated, charging time required to achieve the fully charged state (SOC of 100% or 80%) is calculated (S1100). On this occasion, since it is set that the real-time solar radiation correction request is to be made in the case of a charging installation employing a solar cell (YES in S1050), required charging time is calculated based on the charging performance actually achievable based on the solar radiation amount at the present moment by the charging installation employing the solar cell.

Figure 5:
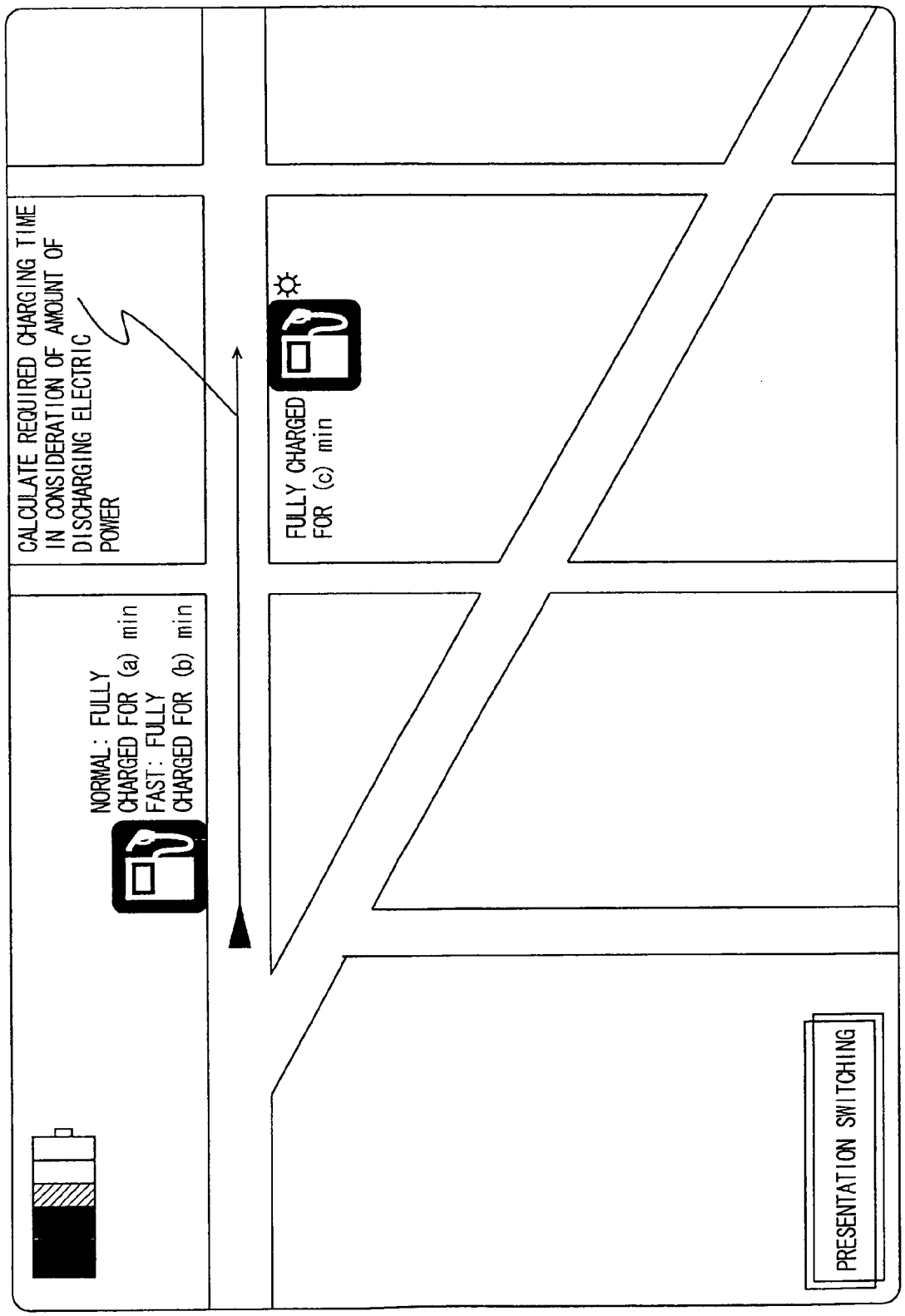
FIG. 5 is a (second) diagram showing one example of a screen displayed on the display device when a process shown in the flowchart of FIG. 3 is executed.

As shown in FIG. 5, the time required for charging is presented in association with each of the locations of the icons representing the charging installations respectively (i.e., the locations in the geographical map) (S1200). In information regarding the charging time in the charging station having the management ID "0002" in FIG. 5 and employing a solar cell, i.e., in the information indicating the charging time "fully charged for (c) time", the real time solar radiation amount correction, and the discharge amount of the battery during the traveling from the present location of the vehicle to the charging station are taken into consideration.

As described above, a navigation device according to the present embodiment allows a vehicle's user to readily select a charging station when a battery thereof needs to be charged at an outside location or when there are a plurality of charging stations in the vicinity of his/her destination. Accordingly, it can be readily determine, for example, how long charging time is required to charge the battery using a charging station that employs a solar cell which generates a varying amount of electric power depending on weather, when the vehicle has not reached the charging station yet.

In addition to/instead of the presentation switching button, a real-time solar radiation correction request button may be displayed. When the real-time solar radiation correction request button is pressed, not the charging time but the charging performance having been through solar radiation correction may be presented in the case of the charging station employing the solar cell.

Second Embodiment

In an embodiment below, a case where the present invention is applied to a vehicle having a solar cell mounted thereon will be described. As with the first embodiment, the vehicle may be a hybrid vehicle, an electric vehicle, or a fuel-cell vehicle as long as it is a vehicle having a power storage mechanism (a battery or a capacitor) for supplying electric power to a motor serving as a driving source for traveling and has a function allowing the power storage mechanism to be charged using an external power source. In the description below, it is assumed that the power storage mechanism is a battery (secondary battery). The solar cell mounted on the vehicle is capable of charging the battery and supplying electric power to the motor serving as a driving source for traveling. Further, since the vehicle in the present embodiment has the solar cell mounted thereon and a solar radiation amount therefore always needs to be considered upon charging the battery with electric power generated by the solar cell mounted on the vehicle, it is set in the initial state that the real-time solar radiation correction request described in the first embodiment is to be made.

Figure 6:
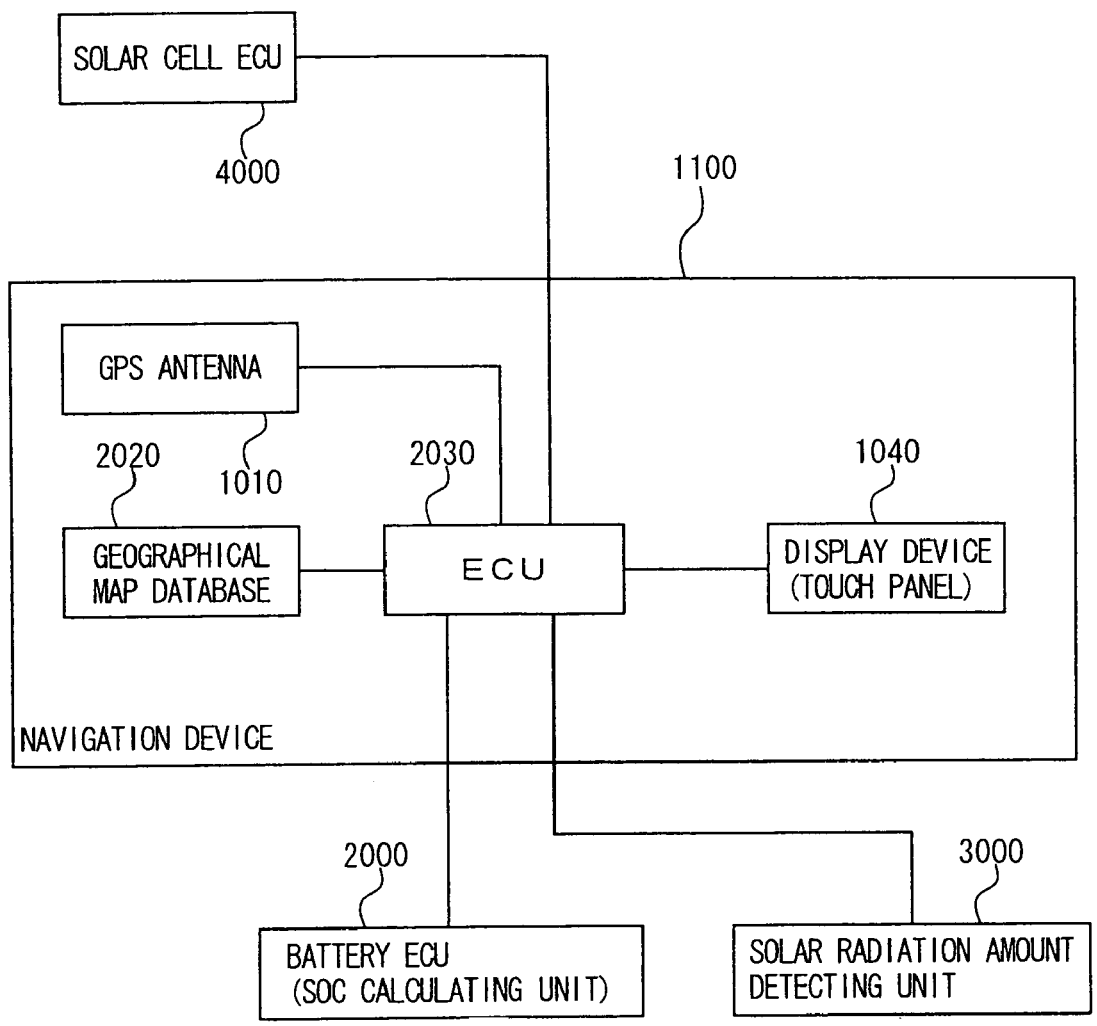
FIG. 6 is a control block diagram of a vehicle including a navigation device according to a second embodiment of the present invention.

FIG. 6 shows a control block diagram corresponding to FIG. 1 and illustrating a vehicle including a navigation device 1100 according to the present embodiment. Note that in the control block diagram shown in FIG. 6, elements having the same functions as those of elements in FIG. 1 are given the same reference characters. Hence, detailed explanation therefor is not repeated here. Note also that a geographical map database 2020 has the same hardware configuration as that of geographical map database 1020 but stores different data. A difference between the databases will be described later. Further, an ECU 2030 has the same hardware configuration as that of ECU 1030 but executes a different program. A difference between the programs will be described later. Since the configurations are different as such, navigation device 1100 is distinguished from navigation device 1000 of the first embodiment described above.

As shown in FIG. 6, the vehicle includes navigation device 1000, a battery ECU 2000, a solar radiation amount detecting unit 3000, and a solar cell ECU 4000 for controlling the solar cell mounted on the vehicle.

Solar cell ECU 4000 controls the solar cell mounted on the vehicle. For example, solar cell ECU 4000 informs ECU 2030 of an amount of generated electric power and electric power generation efficiency.

As shown in FIG. 7, geographical map database 2020 stores, in addition to the information stored in geographical map database 1020 described above, information about a charge amount attained in a parking lot based on electric power generated by the solar cell mounted on the vehicle.

In accordance with geographical map database 2020, the battery can be charged at daytime while the vehicle having the solar cell is parked. Thus, for the information about charging stations, parking lots are regarded as charging stations. As shown in FIG. 7, geographical map database 2020 stores management IDs, location information (latitude data and longitude data) of the parking lots each serving as a charging station, information indicating installation types of the charging stations as a parking lot, and information about a charge amount per unit time (charging performance) attained in each parking lot by the solar cell mounted on the vehicle. Depending on conditions of the parking lots, solar radiation of 100% may not be obtained (for example, in an area between buildings or in an underground parking lot provided with only an artificial light source). Hence, the ratio of the solar radiation amount is stored in percentage. It should be noted that underground parking lots can be excluded from the managed parking lots.

For example, a charging station shown in FIG. 7 and having a management ID "1003" is a parking lot irradiated with solar light well (the ratio of a solar radiation amount is 100%) and is managed as a charging station allowing the solar cell mounted on the vehicle to achieve a charging performance of (D) kWh/min.

Further, a charging station having a management ID "1004" is a parking lot located between buildings but irradiated with solar light tolerably (the ratio of a solar radiation amount is 80%), and is managed as a charging station allowing the solar cell mounted on the vehicle to achieve a charging performance of (E) kWh/min. It is preferable if the database is adapted to store information regarding parking fees in addition to the information indicating the charging performances, because the user readily selects a more inexpensive parking lot providing a good charging performance.

Figure 8:
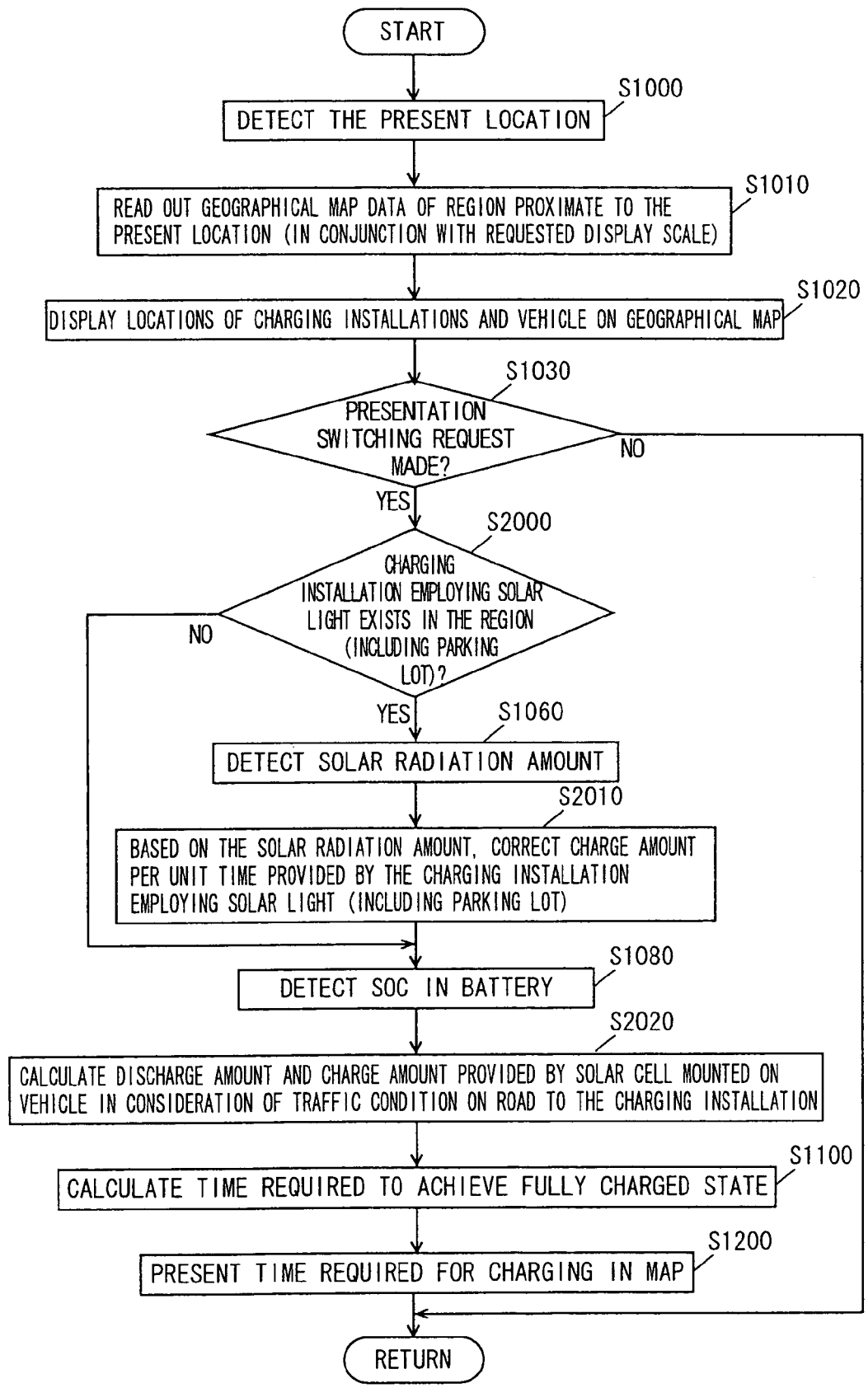
FIG. 8 is a flowchart showing a control structure of a program executed by an ECU of FIG. 6.

Referring to FIG. 8, the following describes a control structure of a program executed by ECU 2030 to control the presentation of the charging stations on the navigation device according to the present embodiment. Note that the same processes in a flowchart of FIG. 8 as those of in FIG. 3 are given the same step numbers. The processes thus given the same step numbers are identical. Hence, explanation therefor is not repeated here.

In an S2000, ECU 2030 determines whether or not a charging installation including a parking lot and employing solar light exists in the displayed region. Whether or not there is a charging installation including a parking lot and employing solar light is determined from geographical map database 2020 shown in FIG. 6 based on the location information and installation types of the charging installations. If it is determined that a charging installation including a parking lot and employing solar light is in the displayed region (YES in S2000), the process goes to S1060. If not (NO in S2000), the process goes to S1080.

In an S2010, ECU 2030 corrects, based on the detected solar radiation amount, a charge amount per unit time provided by the charging installation including a parking lot and employing solar light. For example, a charge amount per unit time (charging performance) provided in a charging station (parking lot) by the solar cell mounted on the vehicle is correlated with a specific solar radiation amount and stored as a performance of 100% in geographical map database 2020 shown in FIG. 7. From the detected solar radiation amount, a ratio of decrease in generated electric power is calculated to correct the charge amount. In this case, when the solar radiation amount is 60%, the parking lot having the management ID "1004" and managed as a charging installation in which only 80% of the solar cell mounted on the vehicle can be used for electric power generation only allows for a power generation performance of 48%, found by multiplying 80% by 60%.

In an S2020, ECU 2030 calculates a charge/discharge amount of the battery based on a distance from the present location of the vehicle to each charging installation and in consideration of traffic conditions. On this occasion, ECU 2030 estimates an amount (discharge amount) of electric power discharged from the battery until the vehicle reaches each charging installation, based on the distance from the present location of the vehicle to each charging installation (if slope or traffic conditions are considered, it is more desirable in terms of precise determination of an actual discharge amount), using a separately stored traveling database (for example, a database in which a relation between a traveling pattern and an amount of charging/discharging electric power or an SOC is mapped). In addition to the estimation, ECU 2030 calculate's an amount of electric power generated by the solar cell mounted on the vehicle while the vehicle is traveling. With this, a SOC in the battery upon arrival at each charging installation can be estimated based on the detected SOC of the vehicle at the present moment (before reaching the parking lot serving as a charging installation) as well as an estimated discharge amount from the battery and an estimated amount of charge provided by the solar cell mounted on the vehicle until the vehicle reaches each charging installation, and charging time required to achieve the fully charged state can be calculated from the estimated SOC.

The following describes an operation performed by the navigation device according to the present embodiment based on the above-described structure and the process of the flowchart, under control of ECU 2030.

During traveling of the vehicle having the solar cell and the navigation device 1000, the location of the vehicle is detected based on data received from the GPS satellites (S1000), geographical map data is read out from geographical map database 1020 in conjunction with a scale (S1010), and the locations of the charging installations (charging stations) including a parking lot and the location of the vehicle are presented in the geographical map on display device 1040 (S1020).

Figure 9:
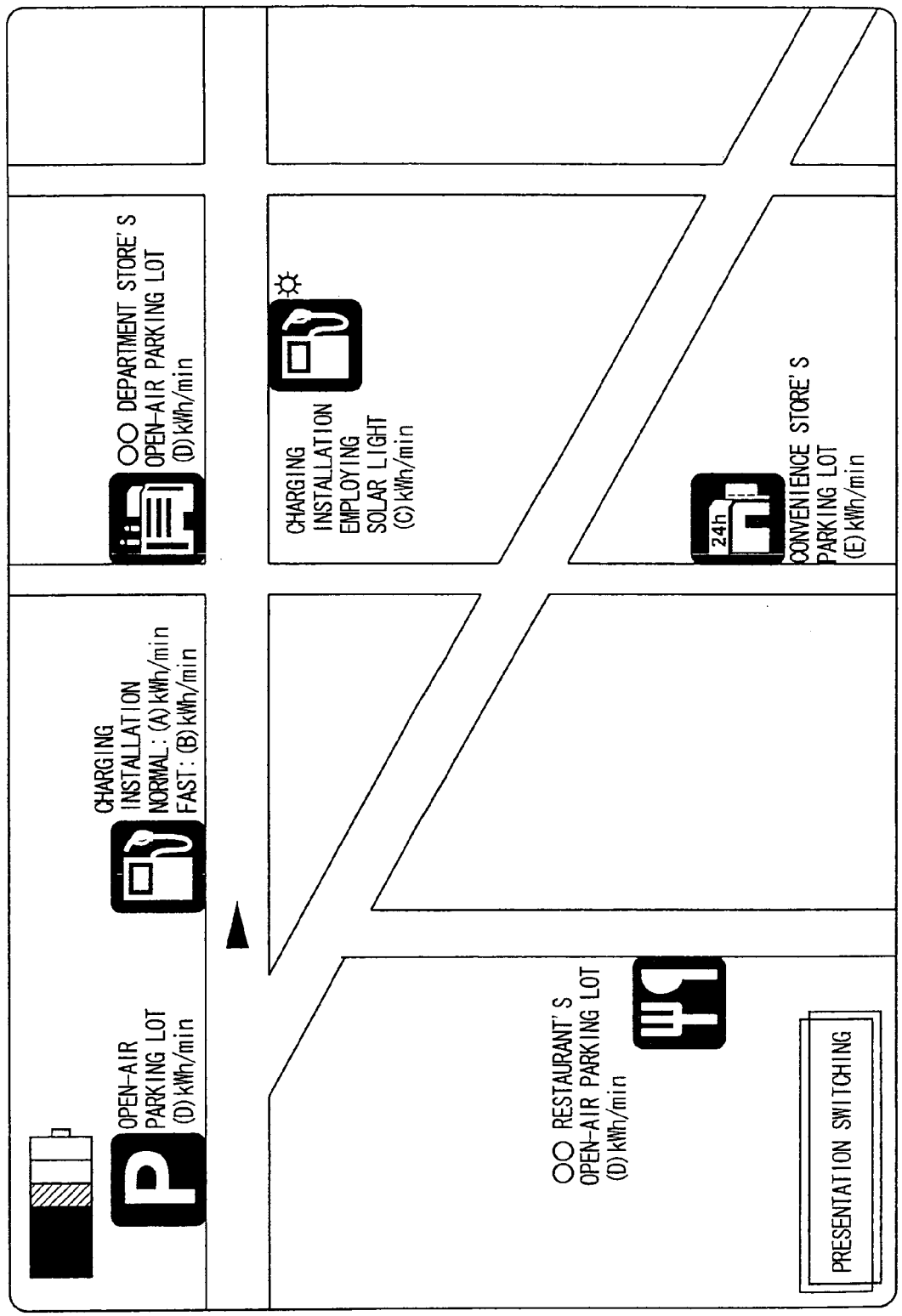
FIG. 9 is a (first) diagram showing one example of a screen displayed on a display device when a process shown in the flowchart of FIG. 8 is executed.

FIG. 9 shows one example of the geographical map displayed on display device 1040 on this occasion. In FIG. 9, charging installations having management IDs "0001" and "0002" in the geographical map database of FIG. 7 are displayed as icons. Also, the charging installations having the management IDs "1003" and "1004" are displayed as icons. It should be noted that an open-air parking lot corresponds to a charge amount attained in the charging installation having the management ID "1003", and a convenience store's parking lot corresponds to a charge amount attained in the charging installation having the management ID "1004". In addition, on the lower left side of the screen of display device 1040, a presentation switching button (for use in the touch panel) is displayed, whereas on the upper left side of the screen of display device 1040, an image is displayed to represent an amount of charge in the battery.

If the user touches the presentation switching button of FIG. 9 (YES in S1030) and a charging installation including a parking lot and employing a solar cell exists in the geographical map currently displayed on display device 1040 (YES in S2000), a solar radiation amount is detected (S1060). A charge amount per unit time is corrected based on an amount of electric power generated based on the detected solar radiation amount, relative to an amount of generated electric power corresponding to a standard (or maximal) solar radiation amount (S1070).

The SOC in the battery at the present moment (assuming that the vehicle has not reached the charging installation yet) is detected (S1080), and a discharge amount of the battery and a charge amount (having been subjected to real time solar radiation amount correction) attained by the solar cell mounted on the vehicle until arrival at the charging installation are calculated in consideration of a distance to the charging installation and traffic conditions (S2020). An SOC in the battery upon the arrival at the charging installation is estimated, and charging time required for charging up to the fully charged state (SOC of 100% or 80%) is calculated from the SOC thus estimated (S1100). Since the real time solar radiation amount correction has been done in the case of a charging installation employing a solar cell, required charging time is calculated on this occasion based on a charging performance actually attainable based on the solar radiation amount at the present moment in the charging installation employing the solar cell (including charging in a parking lot using the solar cell mounted on the vehicle).

Figure 10:
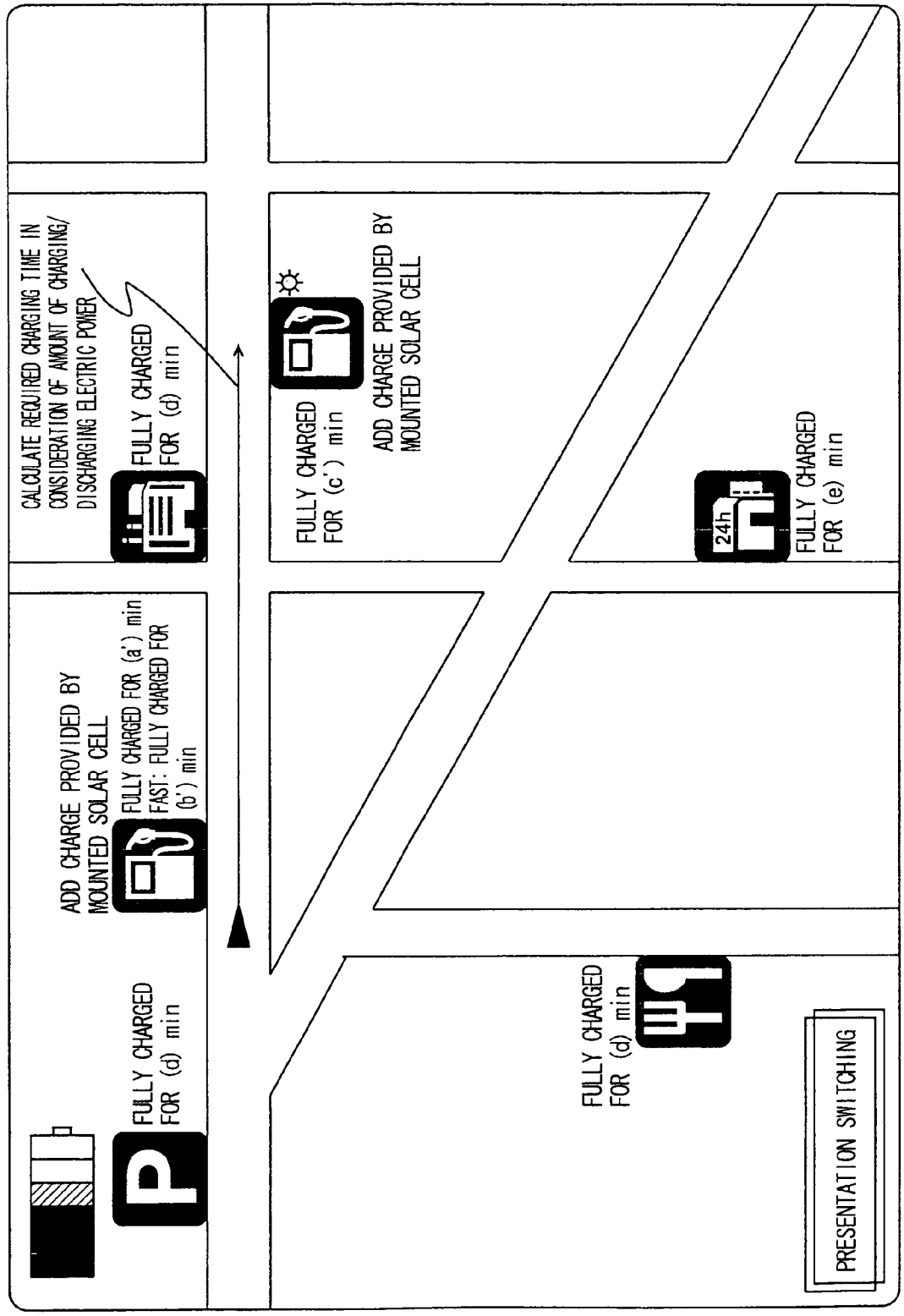
FIG. 10 is a (second) diagram showing one example of a screen displayed on the display device when a process shown in the flowchart of FIG. 8 is executed.

The time required for charging is presented in association with the location of the icon representing each charging installation (i.e., location in the geographical map) as shown in FIG. 10 (S1200).

As shown in FIG. 10, the charging station having the management ID "0001" is a charging installation that employs electric power (the "electric power" herein refers to electric power supplied from an electric power company having a power plant and electric power transmission equipment) and the vehicle has the solar cell mounted thereon. Hence, a charge amount provided by the solar cell mounted on the vehicle is added and is reflected in the displayed normal charging time and fast charging time thereof (the displayed charging time is shorter than the charging time required by a vehicle having no solar cell).

Further, as shown in FIG. 10, the charging station having the management ID "0002" is a charging installation employing a solar cell provided in the charging installation, and the vehicle has the solar cell mounted thereon. Hence, a charge amount provided by the solar cell mounted on the vehicle is added and is reflected in the displayed charging time (the displayed charging time is shorter than the charging time required by a vehicle having no solar cell).

Furthermore, as shown in FIG. 10, in the case of each of the parking lots having the managements ID "1003" and "1004", charging time required to achieve the fully charged state using the solar cell mounted on the vehicle is presented. On this occasion, due to the real time solar radiation amount correction, time required for charging using the solar cell provided on the vehicle is presented in consideration of an amount of electric power generated based on a solar radiation amount in the location of each of the parking lots as well as solar radiation conditions based on the weather at the moment.

Also in the present embodiment, in the information regarding the charging time in each charging installation (including a parking lot), real time solar radiation amount correction as well as a discharge amount of the battery and a charge amount (having been subjected to the real time solar radiation correction) provided by the solar cell mounted on the vehicle during traveling from the present location of the vehicle to the charging station are taken into consideration.

As described above, when a vehicle having a solar cell mounted thereon requires charging of its battery at an outside location or there are charging stations and parking lots in the vicinity of its destination, a navigation device according to the present embodiment allows the vehicle's user to readily select a charging station including a parking lot. This allows the user to readily determine how long charging time is required if, for example, a charging station employing a solar cell generating electric power that varies depending on weather is used, when the vehicle has not reached the charging station yet, in consideration of a charge amount provided by the solar cell mounted on the vehicle.

It should be noted that both in the first and second embodiments described above, information regarding a distance that the vehicle can travel using an amount of charging electric power per unit time may be presented, instead of the amount of charging electric power per unit time (charging performance) or in addition to the charging performance.

Further, also in the first embodiment, a part of control in the second embodiment may be considered (only a road slope is considered, only traffic conditions are considered, only real time solar radiation correction is considered, or the like).

It should be considered that the embodiments disclosed herein are illustrative and non-restrictive in any respect. The scope of the present invention is defined by the scope of claims rather than the description above, and is intended to include any modifications within the scope and meaning equivalent to the terms of the claims.

Industrial Applicability

The present invention is applicable to a vehicle that has a power storage mechanism mounted thereon to supply electric power to a motor serving as a driving source for traveling and has a function allowing the power storage mechanism to be charged using an external power source.

The invention claimed is:

1. A navigation device comprising:
   a display unit for displaying a detected location of a vehicle and stored geographical map information;
   a storage unit for storing location information of a charging facility having a solar cell to charge a power storage mechanism mounted on the vehicle using electric power generated through solar light energy; and
   a control unit for controlling said display unit to present information about said charging facility on said display unit, wherein
   said control unit causes said display unit to present thereon, in association with a location of said charging facility, information about a charging performance in said charging facility attained based on an amount of electric power generated by said solar cell, and
   the information about said charging performance includes information about an amount of charging electric power per unit time and information about a distance in which the vehicle is capable of traveling using the amount of charging electric power per unit time.

2. The navigation device according to claim 1, wherein the information includes information about a ratio of increase of a charge amount per unit time to a fully charged state.

3. The navigation device according to claim 2, wherein said control unit causes the information about the charging performance to be presented in consideration of the amount of electric power generated by said solar cell, which varies depending on a weather condition.

4. A navigation device comprising:
   a display unit for displaying a detected location of a vehicle and stored geographical map information;
   a storage unit for storing location information of a charging facility having a solar cell to charge a power storage mechanism mounted on the vehicle using electric power generated through solar light energy; and
   a control unit for controlling said display unit to present information about said charging facility on said display unit, wherein
   said control unit causes said display unit to present thereon, in association with a location of said charging facility, information about charging time that is based on an amount of electric power generated by said solar cell, and
   the information about said charging time includes information about an amount of charging electric power per unit time and information about a distance in which the vehicle is capable of traveling using the amount of charging electric power per unit time.

5. The navigation device according to claim 4, wherein said control unit causes the information about the charging time to be presented in consideration of the amount of electric power generated by said solar cell, which varies depending on a weather condition.

6. The navigation device according to claim 1, wherein said control unit causes information about charging time in said charging facility to be presented in consideration of a discharge amount resulting from traveling of the vehicle to said charging facility.

7. The navigation device according to claim 6, wherein said control unit causes the information about the charging time in said charging facility to be presented in consideration of a traffic condition during traveling of the vehicle to said charging facility.

8. The navigation device according to claim 1, wherein:
   the vehicle has a solar cell mounted thereon, and
   said control unit causes the information about said charging facility to be presented in consideration of an amount of electric power generated by said solar cell mounted on the vehicle.

9. The navigation device according to claim 1, wherein:
   the vehicle has a solar cell mounted thereon, and
   said control unit causes information about charging time in said charging facility to be presented in consideration of at least one of an amount of electric power generated by said solar cell mounted on the vehicle during traveling of the vehicle to said charging facility and a discharge amount resulting from the traveling.

10. The navigation device according to claim 9, wherein said control unit causes the information about the charging time in said charging facility to be presented in consideration of a traffic condition during traveling of the vehicle to said charging facility.

11. A navigation device, comprising:
    display means for displaying a detected location of a vehicle and stored geographical map information;
    storage means for storing location information of a charging facility having a solar cell to charge a power storage mechanism mounted on the vehicle using electric power generated through solar light energy; and
    control means for controlling said display means to present information about said charging facility on said display means, wherein
    said control means includes means for presenting on said display means, in association with a location of said charging facility, information about a charging performance in said charging facility attained based on an amount of electric power generated by said solar cell, and
    the information about said charging performance includes information about an amount of charging electric power per unit time and information about a distance in which the vehicle is capable of traveling using the amount of charging electric power per unit time.

12. The navigation device according to claim 11, wherein the information includes information about a ratio of increase of a charge amount per unit time to a fully charged state.

13. The navigation device according to claim 12, wherein said control means includes means for presenting the information about the charging performance in consideration of the amount of electric power generated by said solar cell, which varies depending on a weather condition.

14. A navigation device comprising:
a display means for displaying a detected location of a vehicle and stored geographical map information;
a storage means for storing location information of a charging facility having a solar cell to charge a power storage mechanism mounted on the vehicle using electric power generated through solar light energy; and
a control means for controlling said display means to present information about said charging facility on said display means, wherein
said control means includes means for displaying on said display means, in association with a location of said charging facility, information about charging time that is based on said solar cell, and
the information about said charging time includes information about an amount of charging electric power per unit time and information about a distance in which the vehicle is capable of traveling using the amount of charging electric power per unit time.

15. The navigation device according to claim 14, wherein said control means includes means for presenting the information about the charging time in consideration of the amount of electric power generated by said solar cell, which varies depending on a weather condition.

16. The navigation device according to claim 11, wherein said control means includes means for presenting information about charging time in said charging facility in consideration of a discharge amount resulting from traveling of the vehicle to said charging facility.

17. The navigation device according to claim 16, wherein said control means includes means for presenting the information about the charging time in said charging facility in consideration of a traffic condition during traveling of the vehicle to said charging facility.

18. The navigation device according to claim 11, wherein:
the vehicle has a solar cell mounted thereon, and
said control means includes means for presenting the information about the charging facility, in consideration of an amount of electric power generated by said solar cell mounted on the vehicle.

19. The navigation device according to claim 11, wherein:
the vehicle has a solar cell mounted thereon, and
said control means includes means for presenting information about charging time in said charging facility in consideration of at least one of an amount of electric power generated by said solar cell mounted on the vehicle during traveling of the vehicle to said charging facility and a discharge amount resulting from the traveling.

20. The navigation device according to claim 19, wherein said control means includes means for presenting the information about the charging time in said charging facility in consideration of a traffic condition during the traveling of the vehicle to said charging facility.

21. A vehicle comprising the navigation device according to claim 1.

\* \* \* \* \*